United States Patent
Opara et al.

(10) Patent No.: US 6,173,738 B1
(45) Date of Patent: Jan. 16, 2001

(54) PRESSURE MAINTENANCE VALVE FOR PNEUMATIC APPARATUS SUCH AS AIR SPRING SYSTEMS

(75) Inventors: Andreas Opara; Gerhard Lohmann, both of Asperg (DE)

(73) Assignee: DaimlerChrysler AG, Stuttgart (DE)

( * ) Notice: Under 35 U.S.C. 154(b), the term of this patent shall be extended for 0 days.

(21) Appl. No.: 09/350,146

(22) Filed: Jul. 6, 1999

(30) Foreign Application Priority Data

Nov. 26, 1998 (DE) .............................................. 198 54 540

(51) Int. Cl.⁷ .................................................... F16K 17/18
(52) U.S. Cl. .......................... 137/508; 137/510; 137/860
(58) Field of Search .................... 137/508, 510, 137/859, 860

(56) References Cited

U.S. PATENT DOCUMENTS

| | | | |
|---|---|---|---|
| 2,639,194 | * 5/1953 | Wahlin | 137/510 X |
| 3,566,913 | * 3/1971 | Parthe | 137/510 X |
| 3,642,026 | * 2/1972 | Sielaff | 137/859 |

FOREIGN PATENT DOCUMENTS

| | | |
|---|---|---|
| 44 38 192 | 5/1996 | (DE) . |
| 2 308 424 | 6/1997 | (GB) . |
| 64 203127 | 3/1991 | (JP) . |

* cited by examiner

*Primary Examiner*—Stephen M. Hepperle
(74) *Attorney, Agent, or Firm*—Klaus J. Bach

(57) ABSTRACT

In a pressure maintenance valve for pneumatic apparatus including a valve housing having inlet and outlet passages, a valve member is disposed in the housing and includes a membrane having at one side thereof an annular valve structure disposed opposite an annular valve seat which divides the space adjacent the membrane into inner and outer concentric chambers when the valve structure is seated on the valve seat. A valve spring is disposed at the other side of the membrane for biasing the membrane into engagement with the valve seat. One of the concentric chambers is in communication with the inlet passage and the other with the outlet passage, whereby the membrane is held in an open valve position as long as the pressure in the inlet and outlet passages is greater than a certain value but the membrane closes the valve to maintain the predetermined pressure in the outlet passage when the pressure falls below that certain value. The membrane is manufactured in the shape, which it assumes in its valve opening position.

6 Claims, 2 Drawing Sheets

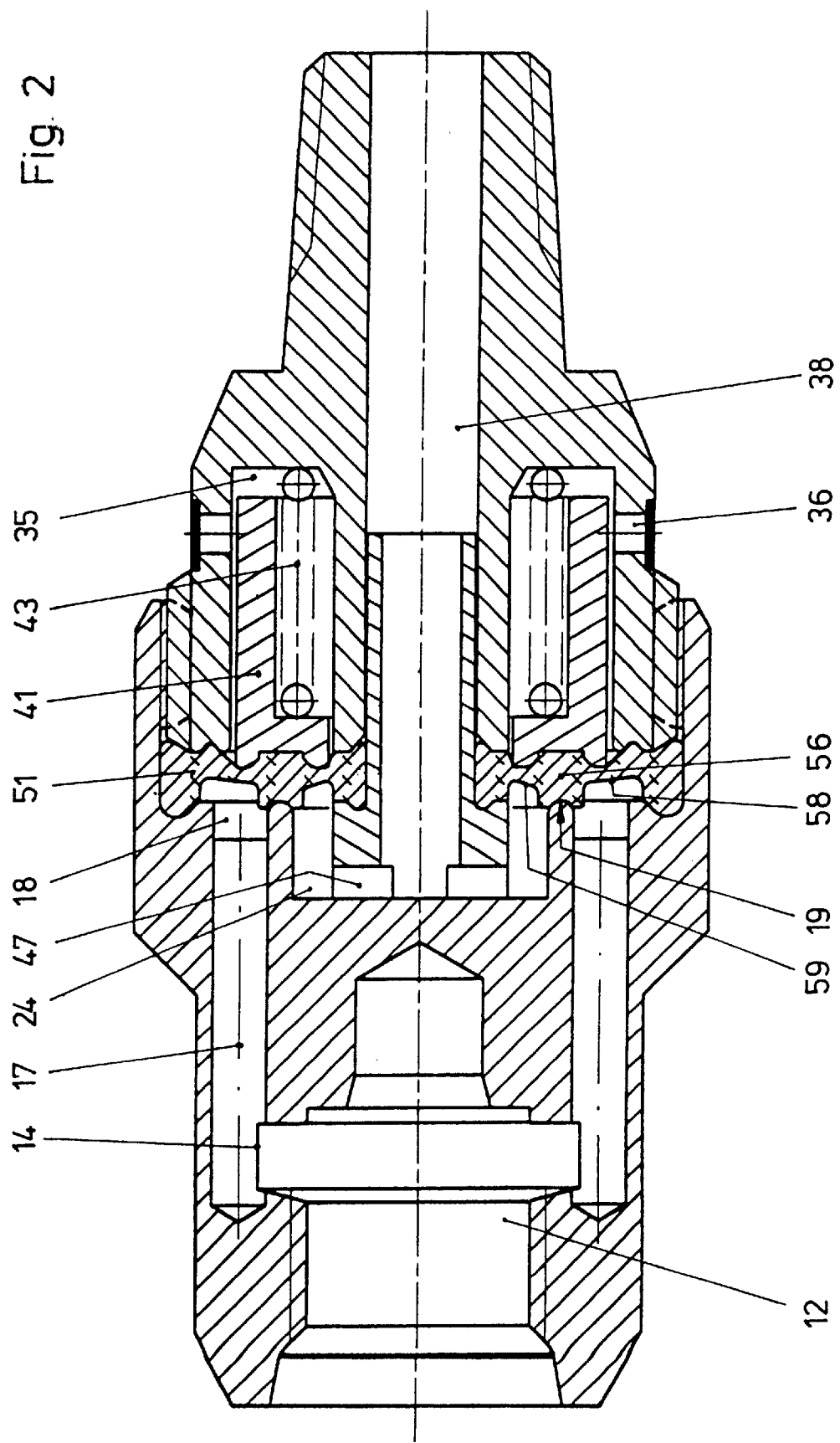

PRESSURE MAINTENANCE VALVE FOR PNEUMATIC APPARATUS SUCH AS AIR SPRING SYSTEMS

BACKGROUND OF THE INVENTION

The invention relates to a pressure maintenance valve for air spring systems and pneumatic apparatus with a housing to which an air supply line originating from a pump and a pressure relief line are connected.

DE 44 38 192 C2 discloses such a pressure maintenance valve. The pressure maintenance valve is to maintain a certain pressure in a consumer, which generally is permanently connected to a pressure source such as a pump or compressor, at a predetermined minimum value when the pump is switched off or has become inoperative or the pressure of the pressure source has dropped or if the consumer has been separated from the pressure source. The known pressure control valve is at least in part of a hose valve design as it has been used in the past bicycle tubes. A supply line connected to a pump terminates in a valve tube which is surrounded by an elastic rubber hose. In contrast to the bicycle tube valve however the duct line leading to the consumer is symmetrical to the supply duct. Also, the rubber hose is fixed at its opposite ends to the valve tube in a gas tight manner. When the rubber hose is expanded by the pump pressure or the consumer pressure, the valve opens. The open position is the normal position, particularly in pneumatic vehicle spring systems. As a result, the rubber hose acting as a valve member is always in a stretched state so that, in time, it loses the elasticity required for appropriate sealing.

It is the object of the present invention to provide a valve member for a pressure maintenance or control valve, which will securely seal in its closed position, which will remain operative over a long life, which comprises only few parts and which requires no servicing.

SUMMARY OF THE INVENTION

In a pressure maintenance valve for pneumatic apparatus including a valve housing having inlet and outlet passages, a valve member is disposed in the housing and includes a membrane having at one side thereof an annular valve structure disposed opposite an annular valve seat which divides the space adjacent the membrane into inner and outer concentric chambers when the valve structure is seated on the valve seat. A valve spring is disposed at the other side of the membrane for biasing the membrane into engagement with the valve seat. One of the concentric chambers is in communication with the inlet passage and the other with the outlet passage, whereby the membrane is held in an open valve position as long as the pressure in the inlet and outlet passages is greater than a certain value but the membrane closes the valve to maintain the predetermined pressure in the outlet passage when the pressure falls below the certain value. The membrane is manufactured in the shape, which it assumes in its valve opening position.

The membrane may be for example in the form of planar apertured disk consisting of a rubber-like elastic material which has the shape in which it was manufactured when the gas pressure in the pressure control valve is at normal system operating pressure. Only when the system pressure falls to a given maintenance level the membrane is deformed to close the valve.

In order to increase the flexibility and/or improve its sealing function, the membrane may have one or several concentric corrugations extending from one or both sides thereof.

Details of the invention will become more readily apparent from the following description thereof on the basis of the accompanying drawings.

BRIEF DESCRIPTION OF THE DRAWINGS

FIG. 2 is a cross-sectional view of the valve in a closed state.

DESCRIPTION OF A PREFERRED EMBODIMENT

Figure 1:
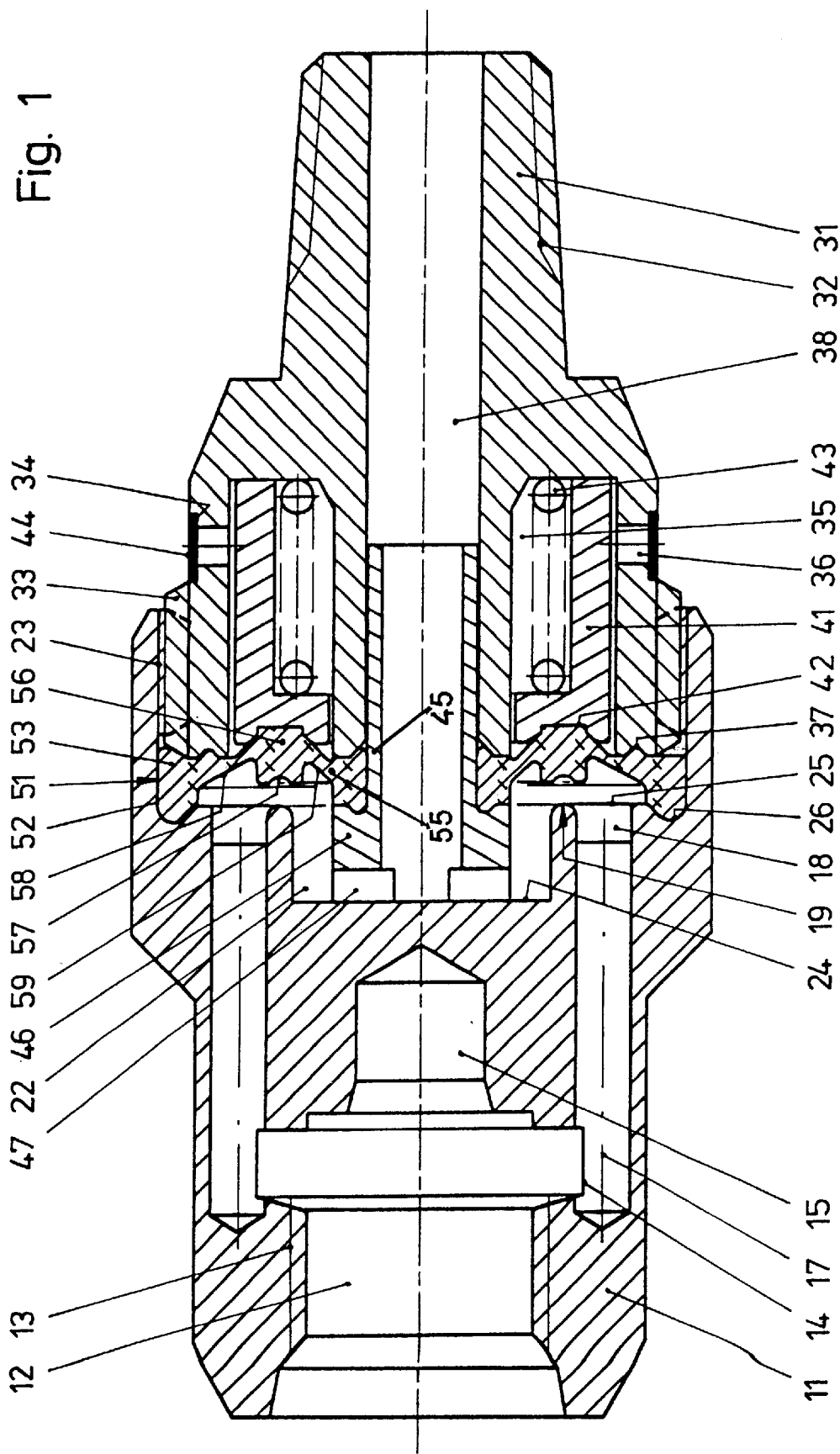
FIG. 1 is a cross-sectional view of a pressure maintenance valve according to the invention shown in an open state.

The pressure control valve as shown in FIGS. 1 and 2 comprises seven building components. Those are three housing parts (11, 31, 45), a valve member (51), a valve spring (43) with its spring guide element (41) and a closing member (44).

The housing parts 11, 31 are essentially turned pieces. The housing part 11 is connected to a pressurized gas supply (pump). It is essentially tubular and has a stepped outer contour and a stepped bore 12, which however does not extend axially through the housing part 11. The bore 12 represents the gas supply opening for the valve. The housing part 11 comprises three sections. The first section is provided with an internal thread 13 for mounting a pressurized gas supply line to the housing part 11. The following section includes an annular recess 14, which intersects the ends of a number of gas supply bores 17 extending parallel to the axis of the valve and being arranged in a circumferentially spaced relationship. The final section includes a blind end bore 15.

At the inner end, the housing part 11 includes an internally stepped bore 22 having a first portion provided with an internal thread 23. The second portion includes a recess 24 with a flat end wall. Between the first and the second portion, there is an intermediate front surface 25 provided with an annular channel 18. The supply bores 17 are drilled into the housing part 11 from the annular channel 18 and provide for communication between the bore 12 and the annular channel 18. The transition between the recess 24 and the annular channel 18 is formed by an annular wall with a semi-circularly rounded front end—as seen in a cross-sectional view—which forms a valve seat 19.

The consumer end housing part 31 also has a stepped outer contour with a conical outer end section having a conical thread 32 for a pressure-tight mounting to a consumer, for example, an air bellows, or an armature disposed in front thereof. The second outer section includes an external thread 33. Adjacent the external thread 33, the second outer section includes an annular recess 34 in which an annular rubber-like elastic ring 44 is disposed for closing radial pressure relief openings 36.

At an inner front surface, the housing part 31 includes an annular axial groove 35 in which a valve spring 43 and a membrane support ring 41 are disposed. The groove 35 is in communication with the annular recess 34 by the radial bores 36 forming the pressure relief openings. The housing part 31 has a central axial passage 38 forming the valve discharge line.

The consumer end housing part 31 is threaded with its external thread 33 into the internal thread 23 of the housing part 11 for interconnection of the two housing parts. Between the two housing parts 11, 31 which may be manufactured for example by aluminum injection molding, a membrane 51 is compressed and held in position so as to serve as a valve member.

The membrane 51 may consist for example of rubber and is manufactured in the form as it is represented in FIG. 1, that is, in the shape which it assumes in the open position of the valve since the valve is in its open position almost for the duration of its life.

The membrane 51 has generally the shape of an apertured disk. Its outer diameter corresponds about to the inner diameter of the internal thread 23, whereas its inner diameter corresponds to the diameter of the central passage 38 extending through the housing part 31. Along its outer and inner circumferences 52 and 54, the membrane 51 includes seal bulges 53 and 54. The outer seal bulge 53 is clamped between an annular recess 26 formed in the intermediate intermediate front surface 25 of the housing part 11 and the inner front end of the housing part 31. The inner front end of the housing part 31 includes an annular groove 37 receiving an annular axial projection of the membrane 51. The center part of the membrane 51 around the center aperture thereof is seated on a tubular component 45, which is disposed within the central passage 38 and projects therefrom toward the housing part 11. At its front end adjacent the housing part 11, the tubular component 51 is provided with a flange 46 through which at least one radial bore extends or which has at least one radial groove 47 at its front end. The radial groove 47 provides for communication between the area around the flange 46 formed by the stepped bore 22 and the central passage 38. The tubular component 45, which may consist of a plastic material, is inserted into the central passage 38 with the membrane 51 disposed thereon. The inner seal bulge 55 of the membrane 51 engages axially the flange 46 of the tubular component 45. The flange 46 is somewhat recessed at the transition to the tubular portion which extends into the central passage 38 to improve seating and sealing of the membrane on the tubular component 45.

When the membrane 51 is mounted, both seal bulges 53, 55 project axially beyond the regular plate-like curved membrane disk surface 58, 59 at the supply side (pump side) of the housing by about 1 mm. As a result the seal bulges 53, 55 abut the housing part 11 and the tubular component 45 in a radial plane when the membrane is subjected to air under pressure.

The membrane 51 includes an intermediate circular bulge 56, which is disposed between the outer and inner membrane disc areas 58 and 59 and which is a valve seal bulge. The valve seal bulge 56 has for example a squared cross-section. Toward the pump-side housing part 11, the seal bulge 56 has an annular seal groove 57, which is disposed directly opposite the valve seat 19 and has a shape complementary to the valve seat 19. The seal bulge 56 forms the valve member part opposite the valve seat 19.

The part of the intermediate seal bulge 56 disposed on the backside of the membrane 51 is seated on the membrane support ring 41. The membrane support ring 41 is a hollow cylindrical member, which has a stepped inner surface forming a flanged cylinder. The flanged cylinder forms in the area of the seal bulge 56 a shoulder, which is engaged by the valve spring 43. The valve spring 43 is seated with its opposite end on the base of the axial groove 35. The front side of the membrane support ring 41 directed toward the pump side includes an annular recess 42, which has a cross-section corresponding to the cross-section of the intermediate seal bulge 56 so as to provide a form-locking interconnection between the seal ring bulge 56 and the support ring 41. The membrane 51, as a result, centers the membrane support ring 41 in the axial groove 35.

The pressure maintenance valve is disposed for example directly at a supporting part of a spring bellows. The spring bellows is connected to the air compressor by way of the pressure maintenance valve. After the pressure maintenance valve is mounted, the spring bellows is filled with compressed air by way of the pressure maintenance valve. Like in a spring bellows already mounted in a vehicle, the compressed air flows from the compressor through a supply line, that is, the stepped bore 12 (see FIG. 2) into the pressure maintenance valve. From the stepped bore 12, the compressed air flows via the recess 14 and the gas supply bores 17 to the annular channel 18. During pressure build up the membrane 51 of the closed valve is seated with its intermediate circular bulge 56 on the valve seat 19 under the force of the valve spring 43. Since, in the shown embodiment, the outer membrane disc area 58 is larger than the inner disc area 59, the valve opens below the minimum maintenance pressure: The membrane 51 is curved toward the discharge end of the valve and the valve bulge is unseated from the valve seat 19 (see FIG. 1). The membrane support ring 41 is seated on the base of the axial annular groove 35 when the valve is fully open so that the membrane is in a stable position. By way of the recess 24, the compressed air reaches the radial groove 47 and then the spring bellows by way of the central passage 38.

The excess pressure developing in the annular axial groove 35 as a result of the opening stroke of the valve membrane 51 is discharged through the radial pressure relief openings 36 to the ambient air. When the air pressure in the bellows and in the central passage 38, that is, on the membrane has reached the maintenance pressure, the supply of pressurized air is stopped. Then, the spring bellows is stored or it is installed in a vehicle. After installation in a vehicle, the spring bellows, which is pressurized with the maintenance pressure is further pressurized. From then on, the valve is generally open up to the next repair or service since the operating pressure of the bellows is always greater than the maintenance pressure. In the open position, the membrane assumes the shape in which it has been manufactured or vulcanized if it consists of rubber. As a result, the membrane is no stretched out of its normal shape when the system is under pressure in normal operation.

Consequently, the aging process of the membrane is slowed down. As a result, the pressure maintenance valve will close tightly by proper seating of the circular bulge 56 on the valve seat 19 and close the valve when the gas supply pressure drops, for example by a pump failure, even after years of operation.

The supply and discharge passages are shown in FIGS. 1 and 2 to be in axial alignment. But they can of course be arranged differently. Also, instead of threaded connections, other connections such as clamp or slide connections may be used. Furthermore, the valve may include a fully cylindrical housing and may be fitted, like a cylindrical plug into a supply pipe, a bore or a hose so as to be sealingly supported therein.

What is claimed is:

1. A pressure maintenance valve for pneumatic apparatus including air spring systems, comprising: a valve housing having inlet and outlet passages, a valve member disposed in said housing and including a membrane supported in said housing and having at one side thereof an annular valve structure disposed opposite an annular valve seat so as to divide the space adjacent said membrane into inner and outer concentric chambers separated by said valve seat when said membrane is forced into engagement with said valve seat, a valve spring engaging said membrane for biasing said membrane into engagement with said valve seat, one of said concentric chambers being in communication with said inlet passage and the other with said outlet passage, said spring being selected to have a spring force sufficient for closing said valve when the pressure in said inlet and outlet passages falls below a predetermined value so as to close said valve for maintaining a desired minimum pressure in said outlet and in a pneumatic apparatus connected thereto, and said membrane having normally the shape which it assumes when said valve is held open by the pressure in said inlet and outlet passages to provide communication between said inlet and outlet passage, said membrane having a central opening and one of said inlet and outlet passages extending through said central opening providing for communication with said inner concentric chamber.

2. A pressure maintenance valve according to claim 1, wherein said membrane has inner end outer circumferential edges provided with seal bulges for sealingly mounting said membrane in said housing.

3. A pressure maintenance valve according to claim 2, wherein, at the side of said membrane adjacent said concentric chambers, said seal bulges are essentially cylindrical rings axially projecting from said membrane.

4. A pressure maintenance valve according to claim 2, wherein said housing includes outer and inner annular recesses and said bulges formed at the outer and inner circumferential edges of said membrane are received in said outer and inner annular recesses respectively for firmly locating and sealingly retaining said membrane.

5. A pressure maintenance valve according to claim 2, wherein, in the area between said outer and inner seal bulges, said membrane includes a circular intermediate bulge forming at the side adjacent said concentric chambers a valve structure for engagement with said valve seat, said valve spring being arranged so as to apply its valve closing force to the other side of said intermediate bulge.

6. A pressure maintenance valve according to claim 5, wherein a membrane support ring is slideably supported in said housing adjacent said intermediate membrane bulge and said support ring includes an annular recess receiving a portion of said intermediate membrane bulge opposite said valve seat and said valve spring engages said membrane support ring.

* * * * *